(No Model.)
W. SCOTT.
STOPPING AND REVERSING MECHANISM FOR PRINTING PRESSES.
No. 459,939. Patented Sept. 22, 1891.
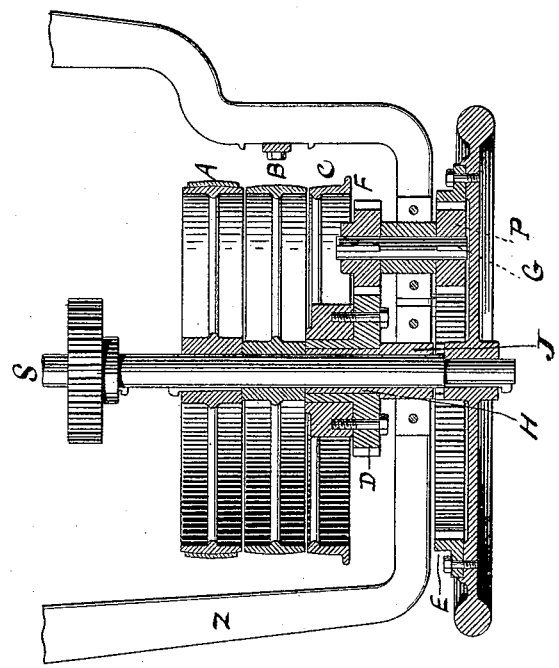
Witnesses
Geo. W. Breck.
Henry W. Lloyd.
Walter Scott Inventor
By his Attorneys
Henry Melville

UNITED STATES PATENT OFFICE.

WALTER SCOTT, OF PLAINFIELD, NEW JERSEY.

STOPPING AND REVERSING MECHANISM FOR PRINTING-PRESSES.

SPECIFICATION forming part of Letters Patent No. 459,939, dated September 22, 1891.

Application filed October 13, 1890. Serial No. 367,947. (No model.)

*To all whom it may concern:*

Be it known that I, WALTER SCOTT, of Plainfield, in the county of Union and State of New Jersey, have invented a new and useful Improvement in Stopping and Reversing Mechanism for Printing-Presses and other Machines, of which the following is a full, clear, and exact description, such as will enable others skilled in the art to make and use the same, reference being had to the accompanying drawing, and to the letters of reference marked thereon, which forms a part of this specification.

The said drawing shows the application of my invention to the shaft of an ordinary printing-press; but it is not confined to machines of this kind, but is applicable to machinery generally wherever a simple, cheap, and efficient mechanism for reversing its motion is desired.

The accompanying drawing represents a horizontal sectional view of the construction of my device.

Z represents the frame of the press, and S the main driving-shaft, supported on suitable bearings. Upon this driving-shaft are three band-pulleys A, B, and C. A is fixed to the shaft S, B is loose upon it, and C is also loose, revolving, not upon the shaft, but upon a sleeve H, inclosing it, which sleeve, as shown in the drawing, is a part of the journal-box J. It is obvious that the same result would be obtained by making the sleeve a part of the hub of the loose pulley B. Bolted or otherwise firmly attached to C is the gear-wheel D and fixed to the end of the shaft is the internal gear-wheel E. The drawing shows the hub of the pulley C upon an extension of the gear-wheel D, which revolves on a sleeve formed by an extension of the journal-box J. This particular construction is not essential, as the extension of the wheel D may be omitted, all that is important being the securing of the revolution of C and D when joined, not on the shaft, but on the sleeve H. A band is shifted from one pulley to another by any of the ordinary devices.

When the band is on the pulley A, it will turn the shaft S and impart a forward motion to the machine. When the band is shifted to B, the pulley alone turns and the machine stops. When the band is shifted to C, the gear-wheel D is revolved and a reverse motion given to the shaft S through the connection of D with E by a proper system of gearing. This gearing may be so arranged as to make the reverse motion slower than the direct, which is often desirable. The accompanying drawing shows the form of such system of gearing. The gear-wheel D meshes with the pinion F, which, with a similar pinion P, is on the short shaft G, with bearings in the frame of the machine. E is an internal gear and meshes with P. If the pulley A, and through it the shaft S, is moved from left to right when the band is shifted to C, D will move from left to right, turning F P from right to left, and P will move E in its own direction, thereby reversing the motion of the shaft S. A slower reverse speed may be obtained by having the ratio of the number of cogs in E to that in P greater than the ratio of that in D to that in F.

It is evident that the pulleys A, B, and C may be exchanged for gears, either frictioned or toothed. a movable friction-pulley or toothed pinion being arranged to engage with either, according to adjustment.

Having thus described my invention and its mode of operation, what I claim as new, and desire to secure by Letters Patent, is—

The combination of a driving-shaft, a fixed pulley, a loose pulley, a second loose pulley having a gear-wheel fixed to it, an internal gear-wheel permanently fixed to the shaft, and a short shaft with its bearings in the frame of the machine, having two pinions, one of them meshing with the gear on the loose pulley and the other with the internal gear fixed on the shaft, as and for the purposes described.

In witness whereof I have hereunto subscribed my name in the presence of witnesses.

WALTER SCOTT.

Witnesses:
WM. J. CONNELL,
G. WAITE TUBBS.